US006179665B1

(12) United States Patent
Rossman et al.

(10) Patent No.: US 6,179,665 B1
(45) Date of Patent: Jan. 30, 2001

(54) MULTI-FUNCTION OUTLET STRIP HAVING CABLE ORGANIZING FEATURES

(75) Inventors: Jon R. Rossman, Chelmsford; Bryan R. Hotaling, Arlington, both of MA (US); Michael P. Clay, Bedminster, NJ (US)

(73) Assignee: Curtis Computer Products, Inc., Provo, UT (US)

(*) Notice: Under 35 U.S.C. 154(b), the term of this patent shall be extended for 0 days.

(21) Appl. No.: 09/189,888

(22) Filed: Nov. 11, 1998

Related U.S. Application Data

(63) Continuation-in-part of application No. 29/092,825, filed on Aug. 27, 1998, and a continuation-in-part of application No. 29/092,823, filed on Aug. 27, 1998.

(51) Int. Cl.⁷ .................................................. H01R 25/00
(52) U.S. Cl. .......................... 439/654; 439/131; 439/142; 439/719; 439/491
(58) Field of Search .................................. 439/214, 371, 439/501, 650, 651, 652, 653, 654, 942, 488–491; 340/635, 644, 650, 656, 659

(56) References Cited

U.S. PATENT DOCUMENTS

| D. 164,338 | 8/1951 | Tyler . |
| D. 274,808 | 7/1984 | Schwartz . |
| D. 288,177 | 2/1987 | Yang . |
| D. 288,298 | 2/1987 | Yang . |
| D. 294,487 | 3/1988 | Banigan . |
| D. 301,576 | 6/1989 | Wang . |
| D. 327,873 | 7/1992 | Luu . |
| D. 350,916 | 9/1994 | Rossman et al. . |
| D. 350,939 | 9/1994 | Rossman et al. . |
| D. 350,940 | * 9/1994 | Rossman et al. .................. D13/142 |
| D. 367,037 | 2/1996 | Fladung et al. . |
| D. 368,893 | 4/1996 | Harwood et al. . |
| 3,019,357 | 1/1962 | Zaffina . |
| 3,257,497 | 6/1966 | Chase . |
| 3,290,453 | 12/1966 | Jensen . |
| 3,997,225 | 12/1976 | Horwinski . |
| 4,095,871 | 6/1978 | Holte . |
| 4,500,150 | 2/1985 | Leibensperger et al. . |
| 4,984,982 | * 1/1991 | Brownlie et al. ..................... 439/131 |
| 5,071,367 | 12/1991 | Luu . |
| 5,457,600 | 10/1995 | Campbell et al. . |
| 5,516,298 | 5/1996 | Smith . |
| 5,579,201 | * 11/1996 | Karageozian ........................ 361/119 |
| 5,589,718 | * 12/1996 | Lee ........................................ 307/72 |
| 5,596,479 | 1/1997 | Campbell et al. . |
| 5,658,158 | * 8/1997 | Milan .................................. 439/214 |
| 5,676,566 | 10/1997 | Carlson, Jr. et al. . |
| 5,775,935 | * 7/1998 | Barna .................................. 439/488 |
| 5,899,761 | * 5/1999 | Crane et al. ........................ 439/142 |
| 5,906,517 | * 5/1999 | Crane et al. ........................ 439/654 |

* cited by examiner

*Primary Examiner*—Lincoln Donovan
*Assistant Examiner*—Brian S. Webb
(74) *Attorney, Agent, or Firm*—Pennie & Edmonds LLP

(57) ABSTRACT

An outlet strip having a cable manager arranged to permit organization of power cables coupled to device receptacles in the outlet strip housing. The cable manager may be positioned at an end of an elongated outlet strip having device receptacles positioned along greater than two surfaces of the outlet strip housing. Alternatively, the cable manager may include a plurality of cable management devices, each device preferably positioned adjacent an associated device receptacle. Various electronic device receptacles, such as electrical plug receptacles, and communication data line jack receptacles, are provided on the outlet strip. Preferably, the electrical plug receptacles are arranged to permit each electrical plug receptacle to accept a transformer block without interfering with access to an adjacent receptacle. Marking elements, each corresponding to a different cable management device, may be provided to identify the device receptacle to which a power cable marked therewith is coupled.

23 Claims, 5 Drawing Sheets

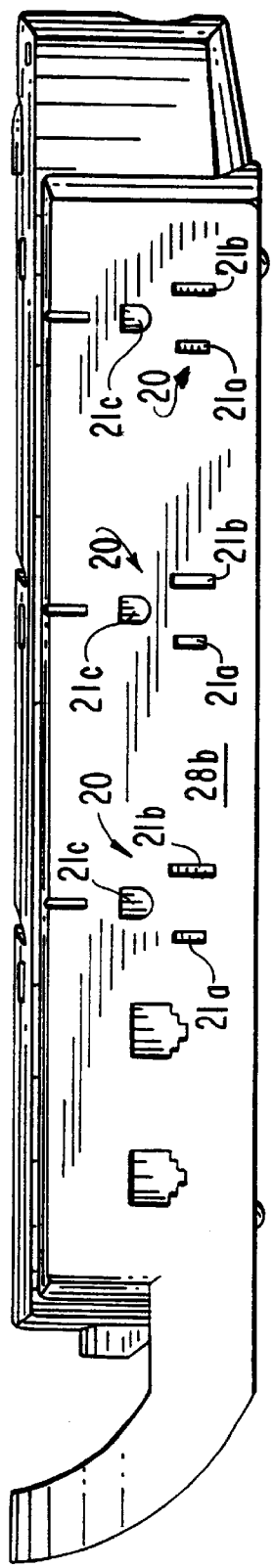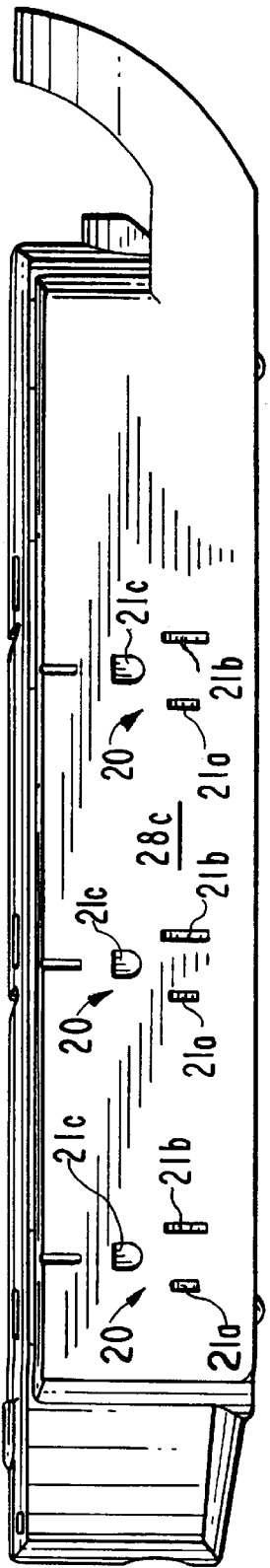

MULTI-FUNCTION OUTLET STRIP HAVING CABLE ORGANIZING FEATURES

CROSS-REFERENCE TO RELATED APPLICATIONS

This application is a Continuation-In-Part of Ser. No. 29/092,825 filed Aug. 27, 1998 and Ser. No. 29/092,823 filed Aug. 27, 1998, which applications are incorporated by reference herein in their entireties.

FIELD OF THE INVENTION

The present invention relates to an outlet strip designed to supply power to a plurality of devices in an organized manner. More particularly, the present invention relates to an outlet strip having a cable manager shaped to maintain cables of powered devices in an organized manner, and formed to permit coupling of a variety of devices thereto in an organized manner.

BACKGROUND OF THE INVENTION

Accompanying the increasing use of powered devices is the increasing use of outlet strips permitting a plurality of devices to be powered through the same wall outlet. However, the connection of a plurality of power cables of various devices to the same outlet strip tends to result in the power cables extending in varying directions in a disorganized manner. Accordingly, there has been an ongoing need to provide an outlet strip with the capability of maintaining order among the various power cables coupled to and extending therefrom. For example, U.S. Patent Des. 350,940 to Rossman et al. provides a surge protector having a cable management element and outlets along two faces of the housing.

Moreover, there has been an increase in the variety of electric, electronic, telecommunication devices used, such as computers, monitors, printers, telephones, facsimile machines, dictation equipment, and lamps, which devices have different power requirements. If the outlet strip only provides one type of outlet, then several different outlet strips must be provided, increasing the disorder of the environment of the powered devices. Accordingly, there has been an ongoing need for the appropriate connections for such differently configured powered devices to be provided in an orderly manner on the same outlet strip. Moreover, in a surge protected outlet strip it would be desirable to provide similar surge protection for devices, such as communication devices and devices utilizing coaxial cable connections, which cannot be electrically connected to the surge protector circuit.

SUMMARY OF THE INVENTION

The present invention provides an outlet strip which includes a plurality of electronic device receptacles for receiving electrical plugs or jacks. A cable manager comprising a plurality of cable management devices is associated with the housing of the outlet strip for ordering power cables along the housing. Each of the device receptacles provided on the outlet strip may be surge protected to protect the device coupled thereto against power surges.

Additionally, the present invention provides an outlet strip which has a top surface and two side surfaces. An electronic device receptacle for receiving electrical plugs or jacks is present on each of the housing surfaces. Thus, the number of devices which may be coupled to the outlet strip of the present invention is greater than the number of devices which may be coupled to an equivalently sized outlet strip not formed in accordance with the principles of the present invention. Preferably, a cable manager is provided on the outlet strip housing to order the cables coupled thereto.

BRIEF DESCRIPTION OF THE DRAWINGS

The detailed description of the present invention will be better understood in conjunction with the accompanying drawings, wherein like reference characters represent like elements, as follows:

FIG. 3 is an elevational view of a first side of the multi-directional outlet strip of FIG. 1;

FIG. 4 is an elevational view of a second side of the multi-directional outlet strip of FIG. 1;

DETAILED DESCRIPTION OF THE INVENTION

Figure 1:
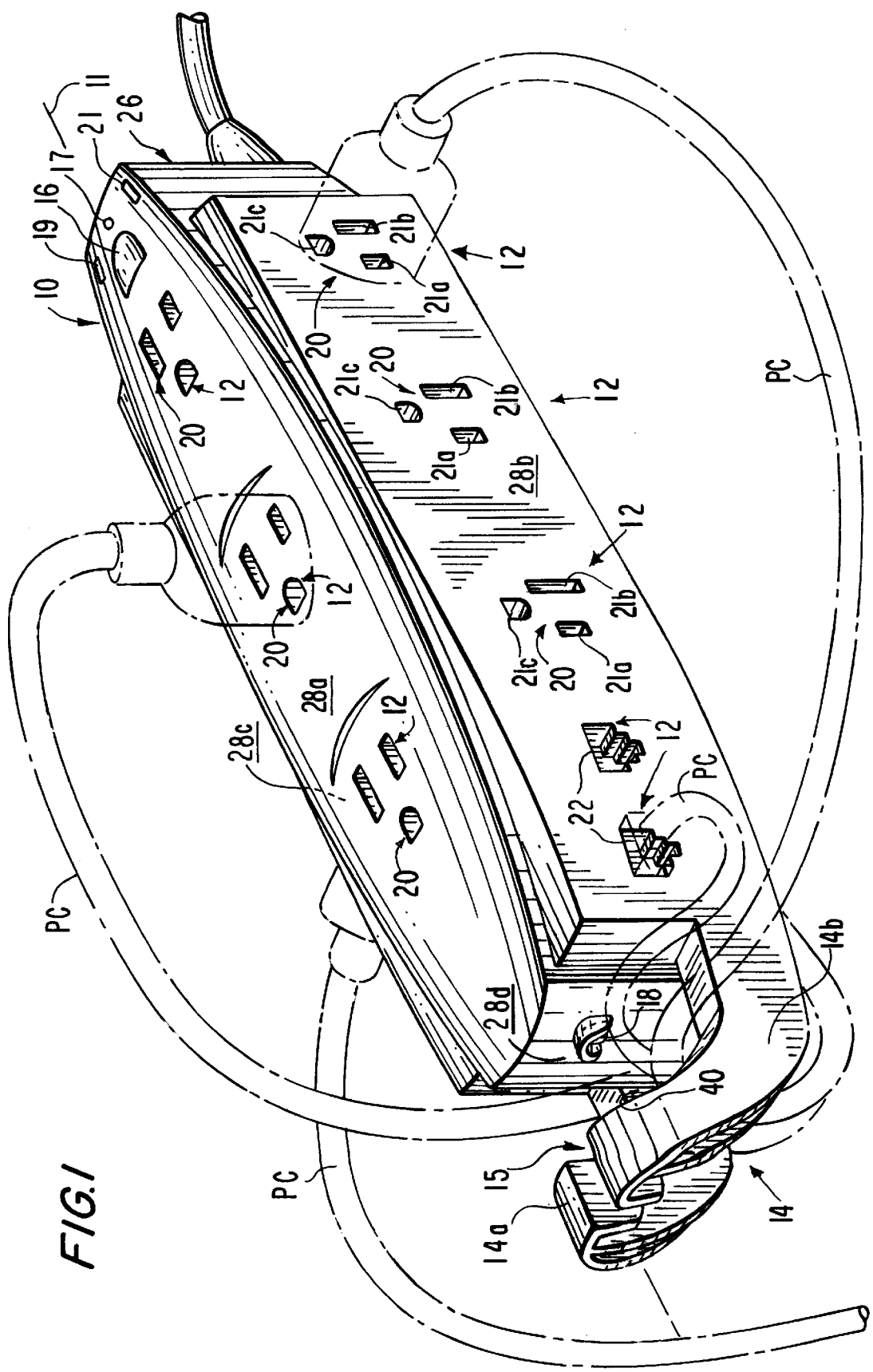
FIG. 1 is a perspective view of a multi-directional outlet strip having device receptacles formed on greater than two housing surfaces thereof and at least one cable manager in accordance with the principles of the present invention.

In accordance with the principles of the present invention, an outlet strip 10, 110 (FIGS. 1 and 2) is provided with a plurality of electronic device receptacles 12, 112, and a cable manager 14, 114 shaped and configured to maintain power cables PC coupled to outlet strip 10, 110 via device receptacles 12, 112 in an orderly arrangement. It will be appreciated that although outlet strips 10, 110 have different features, such as the arrangement of device receptacles 12, 112 and the configuration of cable manager 14, 114, outlet strips 10, 110 nonetheless share several common features. Such common features shared by outlet strips 10, 110 are indicated by similar reference characters, elements of outlet strip 110 being referenced by the same reference characters, increased by a value of 100, used with respect to corresponding elements of outlet strip 10.

As shown in FIG. 1, outlet strip 10 has a plurality of electronic device receptacles 12 extending along longitudinal axis 11 and through which a plurality of powered devices may be coupled to outlet strip 10. Electronic device receptacle 12 includes, without limitation, receptacles such as electrical plug receptacles 20 (which are preferably grounded) and communication data line jack receptacle 22 (for communication data lines such as, but not limited to, telecommunication lines, fax lines, and modem lines). As may be appreciated with reference to FIG. 1, each electrical plug receptacle 20 includes at least a pair of parallel elongated openings 21a, 21b shaped to receive the parallel elongated flat blades of a standard electrical plug. Electrical plug receptacles 20 preferably also include a third prong opening 21c for receiving a grounding prong if provided on the electrical plug to be received by electrical plug receptacle 20. These plugs or jacks contain metal prongs or leads which transmit electrical current. Because receptacles 20 and 22 have different power requirements, these receptacles preferably are electrically isolated from each other. In a preferred embodiment, at least some of electrical plug receptacles 20 are sufficiently spaced apart to permit transformer blocks (e.g., a/c adapters) to be plugged into an electrical plug receptacle 20 without interfering with access to an adjacent receptacle. As may be appreciated with reference to FIGS. 1, 3, and 4, the parallel longitudinal axes of elongated openings 21*a* and 21*b* of each of the electrical plug receptacles 20 on at least one surface of outlet strip 10 are parallel to each other and are not collinear. Such orientation permits a transformer block to be plugged into any of electrical plug receptacles 20 without interfering with access to an adjacent receptacle and without requiring the same amount of spacing between the receptacles as would be required if all elongated openings 21*a* on the same surface were collinear and all elongated openings 21*b* on the same surface were collinear, as in standard outlet strips (or as in top surface 28*a* of the outlet strip 10 shown in FIG. 1). The space saved by orienting receptacles 20 with all elongated openings 21*a* and 21*b* parallel and non-collinear permits additional receptacles, such as an additional electrical plug receptacle 20 or communication data line jack receptacles 22, to be provided on the same surface as such receptacles are provided. Additionally, if electrical plug receptacles 20 are grounded, the three receptacle holes are arranged to accept a transformer block securely, without offsetting the physical balance of housing 26. For example, the third prong may be positioned above the adjacent pair of prongs so that the typically longer portion of a transformer block is oriented upwards. Greater than two communication line jacks 22 may be provided such that communication signals for greater than one device may be passed through outlet strip 10, an input signal being available or two or more output jacks 22. Any type of communication line jack 22 (e.g., RJ11 or RJ45) may be provided for any desired number of lines.

A power button 16 and preferably also an associated on/off indicator 17, such as a light, are provided to selectively supply power to receptacle 12 of outlet strip 10. However, at least one of receptacles 12 may be constantly provided with power regardless of whether power button 16 is on or off. Outlet strip 10 preferably provides surge protection for each of receptacles 12 such that each device connected thereto is protected against power surges which otherwise may damage the device. Surge protection may be achieved through the use of surge suppression devices such as transient voltage surge suppressor devices (e.g., metal oxide varistors (MOVs), varistors, or SIDACtors™ (manufactured by Teccor Electronics, Inc. of Irving, Tex.)). Preferably, surge protection is provided even if power button 16 is off, so long as outlet strip 10 is plugged into a wall receptacle. Because receptacles 20 and 22 have different power requirements, the surge suppression circuits for these different types of receptacles are preferably electrically isolated from each other. If desired, a circuit breaker may also be provided with a reset button 18. Communication line jacks 22 may be provided with line filtering if desired in addition or as an alternative to surge protection.

Outlet strip 10 is preferably provided with indicators 19, 21 electrically coupled to the internal circuitry of outlet strip 10 for electrical status indicating purposes. For example, indicator 19 may be provided to indicate whether the surge suppression circuit is functioning properly and providing surge protection. Indicator 19 may be a light which is on so long as surge protection is provided by outlet strip 10. Alternatively or additionally, an alarm may sound if surge protection is no longer being provided. A wiring status indicator 21, such as a light or an audible alarm, may be provided for such purpose as to indicate the site wiring, i.e., whether the wall receptacle into which outlet strip 10 is plugged is properly wired.

In accordance with the principles of the present invention, and as will be appreciated with reference to FIGS. 1, 3, and 4, housing 26 of outlet strip 10 has at least three power surfaces along which device receptacles 12 are provided. In a preferred embodiment, as shown in FIGS. 1, 3, and 4, a plurality of receptacles 12 are provided on each of a top power surface 28*a*, a first side power surface 28*b*, and a second side power surface 28*c*. Although communication line jacks 22 are shown along first side power surface 28*b*, it will be appreciated that communication line jacks 22 may instead, or in addition, be provided along any or all of the other power surfaces 28*a*, 28*c*. Moreover, it will be appreciated that the present invention is not to be limited to the precise arrangement of receptacles 12 shown in the Figures.

The arrangement of receptacles 12 along greater than two surfaces of housing 26 increases the total number of receptacles 12 which may be provided on outlet strip 10 without increasing the overall size and amount of space occupied by outlet strip 10. Thus, it will be appreciated that other arrangements of power surfaces 28*a*, 28*b*, 28*c* relative to each other are within the scope of the present invention. It will be further appreciated that although housing 26 is substantially rectangular such that side power surfaces 28*b* and 28*c* are each substantially perpendicular to top power surface 28*a*, other housing shapes are within the scope of the present invention.

Housing 26 of outlet strip 10 is designed to handle a plurality of functions. Preferably, the circuits for each function are electrically isolated from one another. In order to permit the unique arrangement of receptacles 12 on greater than three surfaces of outlet strip housing 26, the internal wiring and circuitry of outlet strip 10 must be efficiently arranged within the confines of housing 26. Preferably the signals passing through outlet strip 10 are isolated from one another so that clean signals are output to devices coupled thereto. Such isolation may be accomplished, for example, by providing circuitry for different types of receptacles on different circuit boards. Preferably, such different circuit boards are also physically separated from one another. In particular, it is preferable to separate the low voltage circuits from the high voltage circuits. In a preferred embodiment, receptacles 12 along side power surfaces 28*b*, 28*c* are mounted on vertically arranged circuit boards. Embossments on the interior of housing 26 preferably are provided to hold the circuit boards in vertical, spaced apart positions as well as to support the side receptacles. It will be appreciated that other arrangements of the internal circuitry of outlet strip 10 are within the scope of the invention.

Cable manager 14 of outlet strip 10 preferably is provided at a location convenient for retention of power cables PC coupled to any or all of receptacles 12. In a preferred embodiment, as may be appreciated with reference to FIG. 1, cable manager 14 is provided on an end face 28*d* of outlet strip housing 26 adjacent and extending between power surfaces 28*a*, 28*b*, and 28*c*. Thus, power cables PC extend along longitudinal axis 11 from a respective receptacle 12 to cable manager 14. Cable manager 14 is sized and configured to retain the power cables PC within a substantially confined region adjacent end face 28*d*. In a preferred embodiment, as shown in FIG. 1, cable manager 14 includes first and second arms 14*a*, 14*b* with an insertion slot 15 therebetween through which power cables PC are inserted to be maintained within retention space 40 between arms 14*a*, 14*b*. Arms 14*a*, 14*b* are sufficiently long to permit power cables PC coupled to receptacles 12 along side power surfaces 28b, 28c to enter cable manager 14 sideways.

Figure 2:
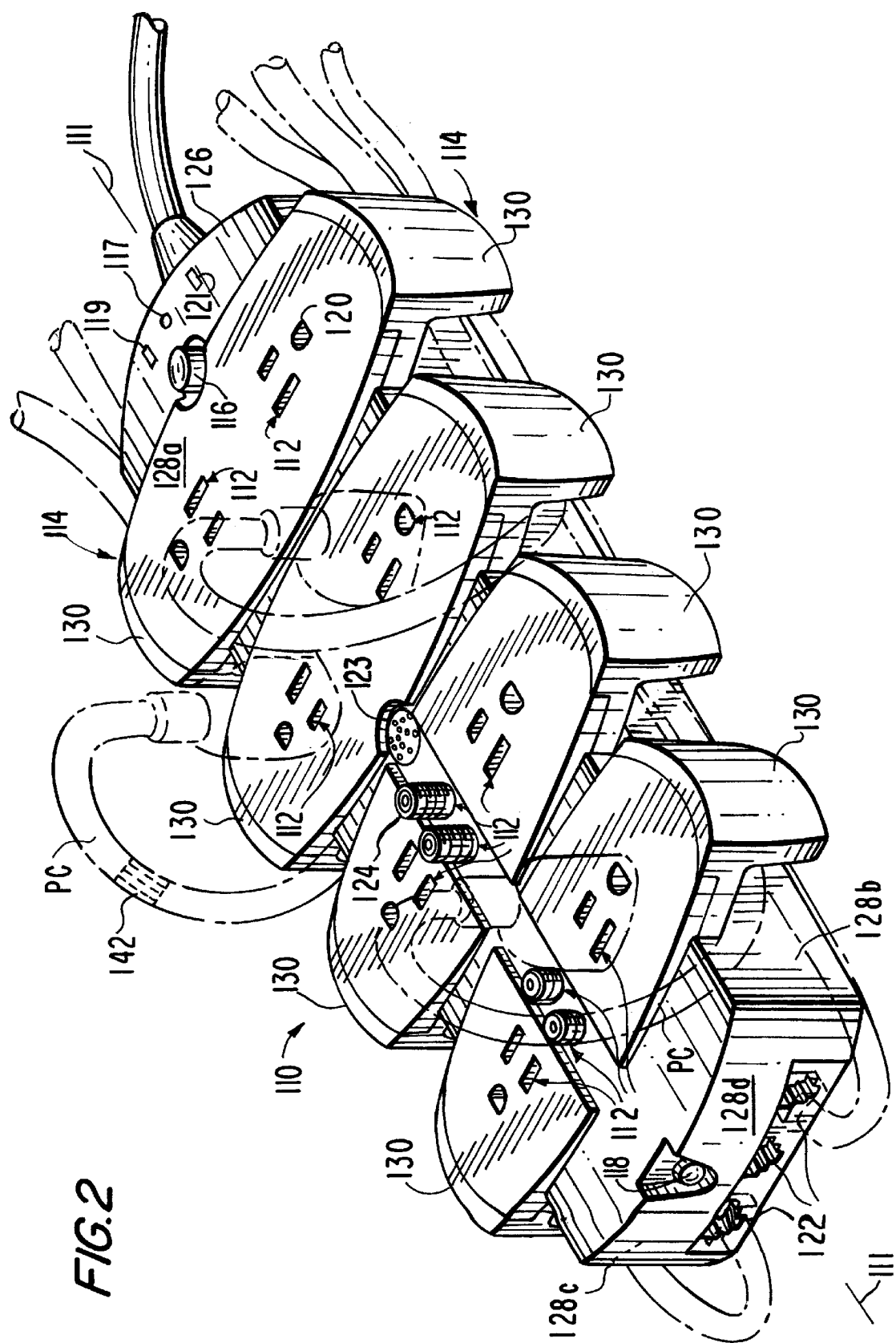
FIG. 2 is a perspective view of an outlet strip having a plurality of cable manager devices formed in accordance with the principles of the present invention.

Outlet strip 110 of FIG. 2 also has a plurality of electronic device receptacles 112, including, without limitation, electrical plug receptacles 120, communication data line jack receptacle 122 (such as described above with reference to jacks 22 of outlet strip 10), and coaxial cable connector receptacles 124 (at least one receptacle for receiving a signal and a corresponding receptacle for emitting the surge protected and/or line filtered signal). Preferably, electrical plug receptacles 120 are grounded. Because receptacles 120, 122, and 124 have different power requirements, these different types of receptacles are preferably electrically isolated from one another. As may be appreciated with reference to FIG. 2, electrical plug receptacles 120 preferably are substantially symmetrically positioned on top power surface 128a on either side of longitudinal axis 111 of outlet strip 110. Preferably electrical plug receptacles 120 are sufficiently spaced to permit transformer blocks (e.g., a/c adapters) to be coupled thereto without interfering with access to an adjacent receptacle 12. Communication line jacks 122 may be provided in an end surface 128d of housing 126 and coaxial cable connectors 124 may be provided on top surface 128a, preferably along longitudinal axis 111, as shown in FIG. 2. However, other arrangements are within the scope of the present invention.

Outlet strip 110 preferably provides similar surge protection, circuit breakers, and/or line filtering as provided by outlet strip 110. Thus, a power button 116 with accompanying power indicator 117, reset button 118, and indicators 119, 121 are similarly provided to serve functions similar to those described above with reference to corresponding elements of outlet strip 10 (referenced by the same reference numeral decreased by a value of one-hundred). Such functions thus are not repeated, reference being made to the above descriptions of similar elements and functions of outlet strip 10. If desired, a speaker 123 may be provided for further indicating purposes, such as an alarm. For instance, an alarm may sound if outlet strip 110 takes a surge. Preferably, surge protection is available so long as outlet strip 10 is plugged into a wall outlet, even if power button 116 is off. Because receptacles 120, 122, and 124 have different power requirements, the surge suppression circuits for these different types of receptacles are preferable electrically isolated from one another.

In accordance with the principles of the present invention, in order to provide orderly management of power cables PC extending from top power surface 128a on both sides of longitudinal axis 111, cable manager 114 includes preferably a plurality of cable management devices 130 extending from each side 128b, 128c of outlet strip housing 126. Most preferably, a cable management device 130 is provided for each electrical plug receptacle 120.

Each cable management device 130 is shaped to at least partially encircle and thereby restrain a power cable PC. In a preferred embodiment, as may be appreciated with reference to FIG. 5, each cable management device 130 is in the form of a hook-like member shaped and configured to maintain power cables PC adjacent outlet strip housing 126 in an orderly manner. Preferably, cable management device 130 has at least a top extension 132 extending outwardly from and substantially parallel to top power surface 128a and a side extension 134 extending downwardly from top extension 132 substantially parallel to side surfaces 128b, 128c.

Figures 5, 6:
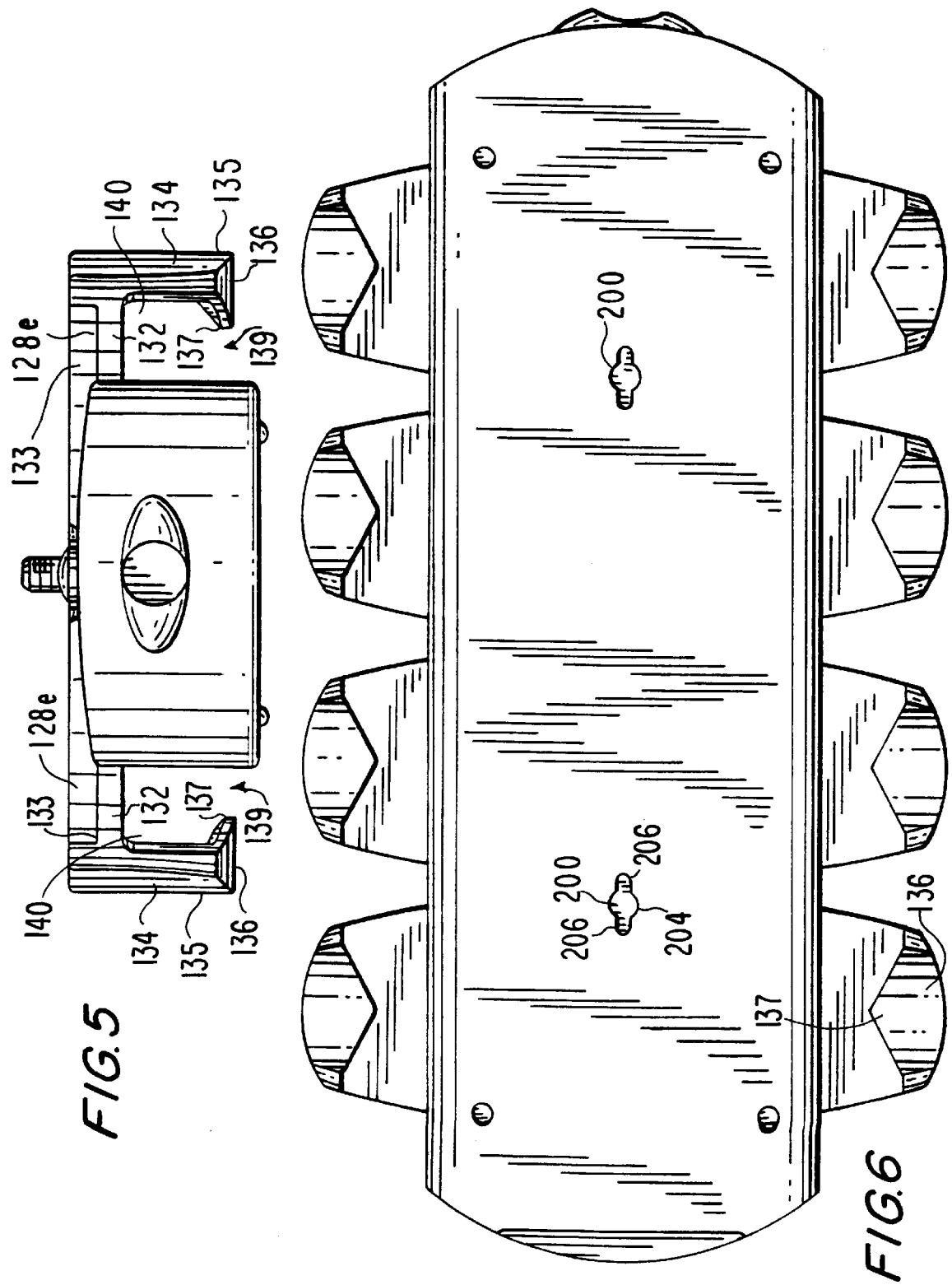
FIG. 5 is an end elevational view of the outlet strip of FIG. 2.
FIG. 6 is a bottom plan view of the outlet strip of FIG. 2.

Although housing 126 and cable manager 114 may be molded as a unitary piece, in order to facilitate manufacturing each cable management device 130 is preferably formed separately from the remainder of housing 126. Most preferably, top extension 132 and side extension 134 are molded as a single, unitary angled piece shaped to form extensions 132, 134. As shown in FIG. 5, top extension 132 is formed with a recess 133 for receiving an attachment extension 128e of top power surface 128a. In a preferred embodiment, housing 126 is formed with upper and lower halves. A portion of top extension 132 preferably extends and is locked between the housing halves, thereby fixing the cable management device 130 to housing 126 and to the remainder of outlet strip 110. It will be appreciated that other manners of fixing each cable management device 130 to housing 126 are within the scope of the invention.

Figure 7:
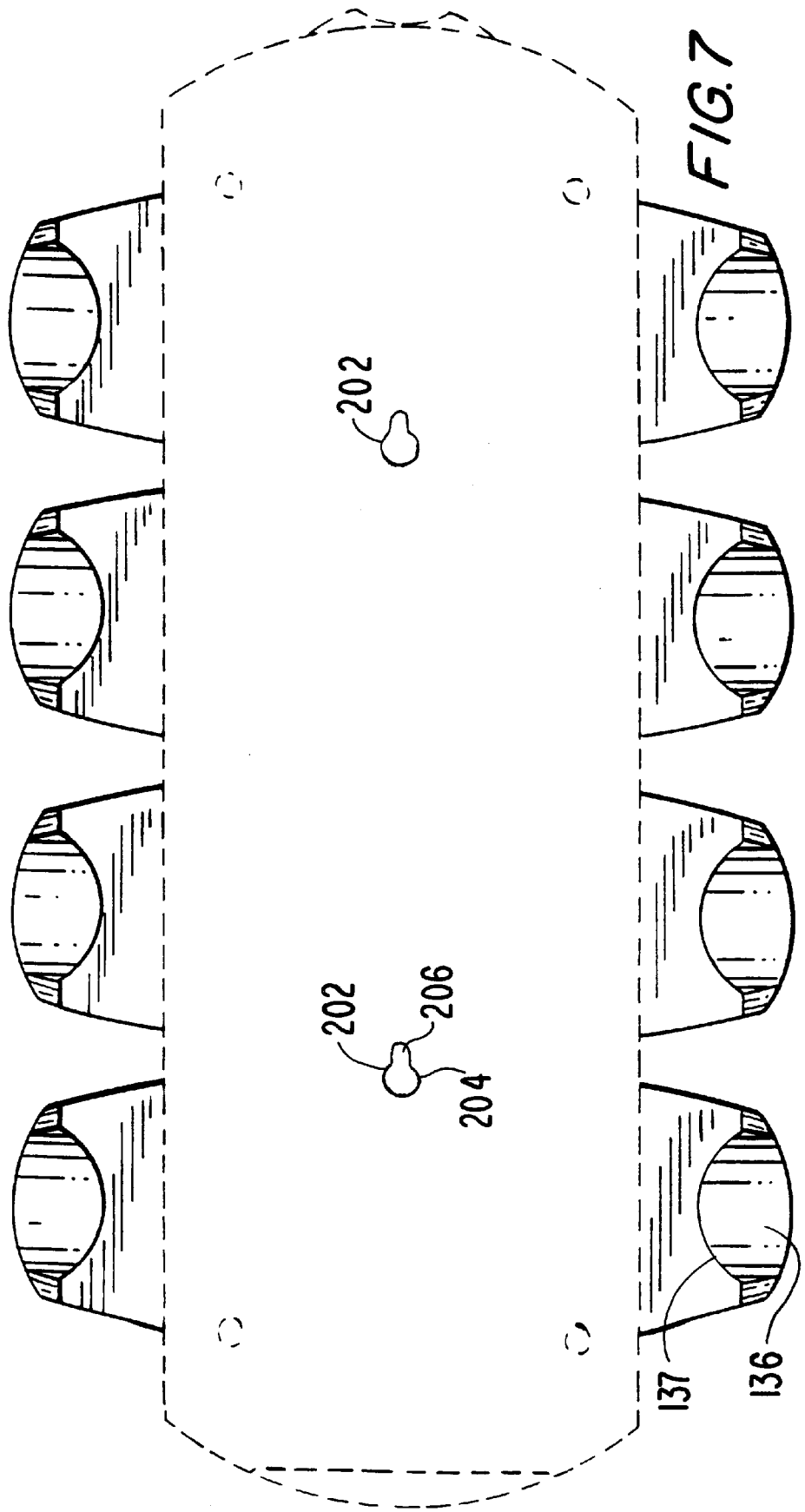
FIG. 7 is a bottom plan view similar to that of FIG. 6, but showing an alternative shape for the bottom ends of the cable manager devices.

In a preferred embodiment, each cable management device 130 also includes a lower extension 136 extending inwardly, towards outlet strip housing 126, from lower end 135 of side extension 134. Lower extension 136 preferably is formed as a unitary piece with upper extension 132 and side extension 134 (i.e., the entire cable management device 130 is molded as a unitary angled piece with extensions 132, 134, 136). Lower extension 136 preferably extends parallel to, but is shorter than upper extension 132, such that free end 137 of lower extension 136 is spaced from outlet strip housing 126 to leave an insertion space 139 therebetween. Insertion space 139 is sized to permit insertion of power cables PC therethrough for retention within a cable retention space 140 substantially enclosed by extensions 132, 134, 136 and outlet strip housing 126. Lower extension 136 permits power cables PC with small diameters to be securely retained by cable management device 130 along with thicker power cables PC. Thus, the size of insertion space 139 and the length of lower extension 136 are selected such that thicker power cables may be passed therethrough, yet small diameter wires also securely maintained within retention space 140. The shape of lower extension 136 need not correspond exactly to the shape of top extension 132, so long as a sufficient ledge is formed by lower extension 136 to support power cables within retention space 140. For instance, free end 137 of lower extension 136 may be pointed, as shown in FIG. 6, or rounded, as shown in FIG. 7.

If it is desired to provide greater flexibility to lower extension 136, such as to facilitate insertion of power cables PC past lower extension 136 and into retention space 140, lower extension 136 may be formed to be more flexible than extensions 132, 134. In such embodiment, it is preferable to choose a flexible material for lower extension 136 which is compatible with the material of extensions 132, 134 so that lower extension 136 may be securely bonded to lower end 135 of side extension 134. For example, cable management devices 130 formed of top extension 132 and side extension 134 may be formed from a relatively rigid moldable material such as polystyrene, polypropylene, polyvinyl chloride (PVC), or acrylonitrile butabiene styrene (ABS), and a separate lower extension 136 formed of polypropylene (or other suitable material) may be bonded thereto. Outlet strip housing 126 is formed from a suitable UL (Underwriter's Labs) grade material which provides the desired rigidity and forming properties (e.g., moldability), such as polystyrene, polypropylene, PVC or ABS.

As described above, cable manager 114 of outlet strip 110 includes a cable management device 130 for each receptacle 120. In a preferred embodiment, cable management devices 130 are formed from a colorable material, each cable management device 130 being colored differently. Additionally, a plurality of bands, labels, tags, clips, or other marking elements 142 are provided for placement on a power cable PC. Each marking element 142 is preferably color coded for one-to-one correspondence with the colored cable management devices 130. Thus, a user may identify the receptacle 114 to which a power cable PC is coupled by matching the color of the associated cable management device 130 (adjacent the receptacle 114) with the color of the matching marking element 142 on the power cable PC, thereby reducing the chance of decoupling the wrong power cable PC from outlet strip 110.

Outlet strips 10, 110 formed in accordance with the principles of the present invention provide power cable management and thus maintain order in the workplace or other environment in which a plurality of powered devices are used. In order to further facilitate the broad concept of maintaining environmental order of power cables of powered devices, outlet strips 10, 110 may be provided with mounting elements 200 or 202 by which outlet strips 10, 110 may be mounted to a surface. As shown in FIGS. 6 and 7, mounting elements 200, 202 may be in the form of openings through which mounting support such as a hook may be inserted. Alternatively, the mounting elements or outlet strips 10, 110 may be in the form of a hook or other element adapted for receipt within a mounting receptacle on a mounting surface. Outlet strip 10, 110 thus may be mounted in a desired location, such as on a wall or under a table, which enhances organization of the environment in which outlet strip 10, 110 is to be used.

Mounting elements 200, 202 are preferably formed with a wider opening 204 for insertion of a mounting support and a narrow, preferably slotted, opening 206 for locking the mounting support in place. As may be seen with reference to FIG. 6, mounting element 200 is in the form of an elongated keyhole having a pair of slots 206 extending from opposite sides of an insertion opening 206. As may be seen with reference to FIG. 7, mounting element 202 is in the form of a traditional keyhole having a single slot 206 extending, preferably along longitudinal axis 11, 111, from one side of an insertion opening 206. It will be appreciated that other forms of mounting elements may be provided in addition to or instead of the mounting elements described herein, the scope of the present invention not being limited to the precise configurations depicted in FIGS. 6 or 7. It will further be appreciated that although mounting elements 200, 202 are shown on the bottom face of outlet strip 110, the same mounting elements 200, 202 may be provided on the bottom face of outlet strip 10, and thus the bottom face of outlet strip 10 is not shown for the sake of simplicity.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. For example, instead of color coding the cable management devices, another identification system such as a numbering system may be used to identify the device receptacle to which a particular power cable is coupled. Moreover, features of one of the disclosed outlet strips not shown or described with respect to the other disclosed outlet strip may nonetheless be provided in the other outlet strip. The presently disclosed embodiments are therefore to be considered in all respects as illustrative and not restrictive, the scope of the invention being indicated by the appended claims, and not limited to the foregoing description.

What is claimed is:

1. "An outlet strip comprising:

A housing which includes a plurality of electrical plug receptacles configured for receiving electrical plugs; and A cable manager comprising a plurality of cable management devices extending from a first surface of said housing and being shaped to at least partially encircle and thereby restrain and order power cables along said housing, said cable management devices associated with said electrical plug receptacles in a one-to-one correspondence."

2. An outlet strip as in claim 1, wherein:

said housing has a longitudinal axis, a top surface and first and second side surfaces on opposite sides of said longitudinal axis;

said receptacles are located in said top surface of said housing; and said plurality of cable management devices are located along said side surfaces of said housing.

3. An outlet strip as in claim 2, wherein:

at least one of said cable management devices has a first arm extending outwardly from said top surface of said housing and a second arm extending downwardly from said first arm and along said side surface of said housing; and said first arm, said second arm, and said housing form a retention space therebetween shaped to retain a power cable coupled to a receptacle in said housing.

4. An outlet strip as in claim 3, wherein said first arm is rigidly secured to said outlet strip housing.

5. An outlet strip as in claim 3, wherein each of said plurality of cable management devices includes a first arm extending outwardly from said top surface of said housing and a second arm extending downwardly from said first arm and along said side surface of said housing.

6. An outlet strip as in claim 3, wherein:

said second arm of said at least one cable management device has a lower end; and said at least one cable management device further includes a third arm extending inwardly from said lower end of said second arm toward said housing and forming a lower side of said retention space.

7. An outlet strip as in claim 6, wherein said third arm has a free end spaced from said side surface of said housing to provide an insertion space sized to permit insertion of a power cable therethrough and into said retention space.

8. An outlet strip as in claim 6, wherein each of said plurality of cable management devices includes a first arm extending outwardly from said top surface of said housing, a second arm extending downwardly from said first arm and along said side surface of said housing and having a lower end, and a third arm extending inwardly from said lower end of said second arm toward said housing.

9. An outlet strip as in claim 6, wherein at least said first and second arms are rigid and said third arm is flexible.

10. An outlet strip as in claim 1, wherein each of said cable management devices is aligned with its corresponding electrical plug receptacle.

11. An outlet strip as in claim 10, wherein:

each of said cable management devices has a different color; and said outlet strip further includes a plurality of marking elements each having the same color as an associated cable management device.

12. An outlet strip as in claim 1, wherein said outlet strip:

further includes electronic device receptacles from the group consisting of communication data line jacks receptacle and coaxial cable connector receptacles; and provides surge protection to at least one of said electrical plug receptacles and said electronic device receptacles.

13. An outlet strip as in claim 12, further comprising a line filtering circuit for at least one of said communication data line jack receptacles and said coaxial cable connector receptacles.

14. An outlet strip as in claim 12, further comprising indicators coupled to said outlet strip to indicate the electrical status of said outlet strip.

15. An outlet strip as in claim 1, further comprising a mounting element adapted to permit mounting of said outlet strip on a surface.

16. "An outlet strip comprising:

a housing having a top surface, a first side surface, and a second side surface, said first side surface and said second side surface being substantially parallel to each other and perpendicular to said top surface; and a plurality of electronic device receptacles is present on each of said top surface, said first side surface, and said second side surface of said housing for receiving electrical plugs or jacks;

where in on one of said top surface, said first side surface, and said second side surface more than one electrical plug receptacle having first and second parallel elongated openings is provided, with all of said first and second parallel elongated openings of said more than one electrical plug receptacles on said first side surface and said second side surface being parallel and non-collinear; and wherein said electrical plug receptacles on said top surface, first side surface, and second side surface are sufficiently spaced along said longitudinal axis to permit mounting of transformer blocks to adjacent electrical plug receptacles."

17. An outlet strip as in claim 16, wherein:

said housing further comprises an end surface extending between said side surfaces; and said outlet strip further comprises a cable manager extending from said end surface.

18. An outlet strip as in claim 17, wherein said cable manager comprises first and second arms forming a retention space therebetween shaped to retain a power cable coupled to a device receptacle in said housing.

19. An outlet strip as in claim 18, wherein said first and second arms of said cable manager have ends spaced apart to form an insertion slot therebetween through which a power cable coupled to a device receptacle in said housing is inserted to be maintained within said retention space.

20. An outlet strip as in claim 16, wherein:

said device receptacles include electrical plug receptacles and communication data line jack receptacles; and said outlet strip provides surge protection to said device receptacles.

21. An outlet strip as in claim 20, further comprising a line filtering circuit for said communication data line jacks.

22. An outlet strip as in claim 16, wherein each of said first and second side surfaces includes more than one electrical plug receptacle with first and second parallel elongated openings, all said first and second parallel elongated openings being parallel and non-collinear.

23. An outlet strip as in claim 22, wherein said first and second side surfaces are substantially parallel to each other and perpendicular to said top surface.

\* \* \* \* \*